US006804520B1

(12) United States Patent
Johansson et al.

(10) Patent No.: US 6,804,520 B1
(45) Date of Patent: Oct. 12, 2004

(54) TEMPORARY SERVICE INTERRUPTION FOR HIGH SPEED DATA TRANSFER

(75) Inventors: Ingemar Johansson, Luleå (SE); Erik Jönsson, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 593 days.

(21) Appl. No.: 09/702,824

(22) Filed: Nov. 1, 2000

(51) Int. Cl.$^7$ ................................................ H04Q 7/20
(52) U.S. Cl. .................... 455/450; 455/452.1; 455/512; 455/513; 455/515; 370/329; 370/341; 370/468
(58) Field of Search ............................... 455/450, 452.1, 455/452.2, 509, 522, 512, 513, 515, 516, 436, 67.11, 115.1, 226.1; 370/395.4, 395.41, 395.42, 328, 329, 341, 431, 433, 468

(56) References Cited

FOREIGN PATENT DOCUMENTS

| EP | 0 831 669 A | 3/1998 |
| WO | 97/15165 A | 4/1997 |
| WO | 98/35514 A | 8/1998 |
| WO | 00/25483 A | 5/2000 |
| WO | 00/41542 A | 7/2000 |
| WO | 00/54437 A | 9/2000 |

OTHER PUBLICATIONS

*Wireless Networks*, ACM, US, vol. 2, No. 3, Aug. 1, 1996, pp. 249–26, XP000625343, ISSN: 1022–0038, A. Iera et al., "Transport and Control Issues in Multimedia Wireless Networks".

Primary Examiner—Erika Gary
Assistant Examiner—Temica M. Davis
(74) Attorney, Agent, or Firm—Nixon & Vanderhye P.C.

(57) ABSTRACT

In a mobile radio communications system, first radio resources are allocated to a first mobile radio communication. The term "radio resources" relates to one or more resources used to support a mobile radio communication and may include, for example, radio bandwidth, transmit power, signal and data processing hardware and software resources, radio transceiving resources, etc. A second group of radio resources is allocated to a second mobile radio communication. When a block of user information needs to be transmitted that requires an additional amount of radio resources, the first and second mobile radio communications are interrupted or their service levels are reduced for a brief time period. At least part of the block of information is transmitted during that time period using at least some of the first and second radio resources allocated for the first and second mobile radio communications. After that time period, transmission of the first and second mobile radio communications is resumed at full (or partial) service levels.

34 Claims, 5 Drawing Sheets

TEMPORARY SERVICE INTERRUPTION FOR HIGH SPEED DATA TRANSFER

FIELD OF THE INVENTION

The present invention relates to radio communications, and in particular, to high speed data transfers in a radio communications network.

BACKGROUND AND SUMMARY OF THE INVENTION

In a cellular communications system, a mobile radio station communicates over an assigned radio channel with one or more base stations. Several base stations are connected to a switching node, which is typically connected to a gateway that interfaces the cellular communications system with other communications systems. A call placed from an external network to a mobile station is directed to the gateway, and from the gateway through one or more nodes to one or more base stations serving the called mobile station. One or more base stations page the called mobile station and establish a radio communications channel. A call originated from the mobile station follows a similar path in the opposite direction except that there is no paging step.

In a Code Division Multiple Access (CDMA) mobile communication system, spreading codes are used to distinguish information associated with different mobile stations or base stations transmitting over the same radio frequency band. In other words, individual radio "channels" correspond to and are discriminated on the basis of these codes. Various aspects of CDMA are set forth in one or more textbooks such as *Applications of CDMA and Wireless/Personal Communications*, Garg, Vijay K. et al., Prentice-Hall 1997.

Spread spectrum communications permit mobile transmissions to be received at two or more ("diverse") base stations and processed simultaneously to generate one received signal. With these combined signal processing capabilities, it is possible to perform a handover from one base station to another, (or from one antenna sector to another antenna sector connected to the same base station), without any perceptible disturbance in the voice or data communications. This kind of handover is typically called soft or diversity handover.

Certain problems must be considered in a CDMA communications system. Because all users transmit information using the same frequency band at the same time, each user's communication interferes with the communications of the other users. Therefore, the power of radio transmitters in a CDMA system must be carefully controlled. Another problem is that the physical characteristics of a radio channel vary significantly. For example, the signal propagation loss between a radio transmitter and receiver vanes as a function of their respective locations, obstacles, weather, etc. As a result, large differences may arise in the strength of signals received at a radio receiver from different radio transmitters. If the transmission power of a radio transmitter signal is too low, the receiver may not correctly decode a weak signal, and the signal will have to be corrected (if possible) or retransmitted. Erroneous receipt of signals adds to congestion in a cell.

Accordingly, desired transmit powers are allocated to down link traffic channels, (i.e., downlink is in the base-to-mobile direction), so that the mobile stations receive the traffic information at an appropriate signal level. The transmit power allocated to such traffic channels may be adjusted to accommodate changing channel conditions resulting from movements of mobile stations, multipath propagation, weather, obstacles, and a current interference level experienced in a cell. But the problem with increasing transmissions of one communication is that it adversely impacts other communications in the same cell or even adjacent cells by increasing the interference level for those other communications. Thus, the transmit power levels corresponding to those other communications may also be increased in response to the increased interference which further compounds the overall interference problem. When the traffic load in a particular cell among the plurality of cells in a mobile communications network exceeds an overload condition, (e.g., the capacity of existing traffic channels, a total traffic channel power level, etc.), that cell is forced to block new mobile radio calls, or to even drop existing calls, in particularly severe overload conditions. In both cases, the system performance is adversely impacted.

As third generation cellular systems have evolved to provide a wide variety of data services as well as speech services involving mobile subscribers, the need for high speed data transfer service has become particularly important. Unfortunately, high speed transfer of large amounts of data competes with limited radio resources, including radio bandwidth, transmit power, and signal/data processing resources (both software and hardware), needed to support such high speed data services. Faced with insufficient bandwidth, transmit power, signal data processing resources, or other resources to support the high speed data transfer, a service request may be rejected or significantly delayed.

The following is a simple example where two users A and B are conducting a speech conversation via their respective mobile terminals, a user A indicates a desire to send a large data file to user B.

User A: "I have an electronic slide presentation that describes exactly what I am talking about."

User B: "Can I have a look at it?'"

User A: "Sure, you can see it . . . now."

User B: After taking a look at slide says, "Ah, I see your point . . . "

If the radio bandwidth, transmit power, or signal/data processing resources are insufficient at the time of this conversation to support that electronic slide data file transfer, the file transfer request will either be rejected or the transfer will be delayed for a significant period of time. Both scenarios cause some user irritation, particularly if the delay is for an indeterminate period of time.

Although it is possible to increase the transmit power of user A's mobile terminal in order to send the large data file, the increased transmit power adversely impacts other connections by adding to the interference experienced by other users. Of course, additional radio bandwidth or signal/data processing resources may be requested and allocated to a user to accommodate high speed transfer of the data file. But those resources may not always be available. Thus, there is a need to provide transfer of a data file at high speed when the available resources are not sufficient to complete the data transfer in a reasonably short period of time. The present invention meets this need without having to increase transmit power.

It is an object of the present invention to accommodate high speed data file or large data packet transfer in a mobile radio communications system.

It is a further object of the present invention to accomplish high speed data file or large data packet transfer without significantly increasing transmit power.

It is a further object of the present invention to accommodate high speed data file or large data packet transfer even when available radio and signal/data processing resources are not sufficient to complete that transfer in a reasonably short period of time.

These objects are accomplished without significantly impacting current services being provided to other users.

In a mobile radio communications system, first radio resources are allocated to a first mobile radio communication. The term "radio resources" refers to one or more resources used to support a mobile radio communication. Specific examples of radio resources include radio bandwidth, transmit power, signal and data processing hardware and software resources, radio transceiving resources, etc. A second group of radio resources is allocated to a second mobile radio communication. When a block of user information needs to be transmitted that requires an additional amount of radio resources, the first and second mobile radio communications are interrupted or their service levels are reduced for a time period (hopefully brief). At least part of the block of information is transmitted during that time period using at least some of the first and second radio resources allocated for the first and second mobile radio communications. In one example and non-limiting embodiment of the invention, an interruption may be performed using a discontinuous transmission (DTX) operation.

After that time period, transmission of the first and second mobile radio communications is resumed at full (or partial) service levels. The resumed transmission may be a full resumption, where all of the allocated first and second resources are restored to first and second communications. Alternatively, when a part of the data block remains to be transmitted, the resumed transmission may be a partial resumption, with only part of those first and/or second radio resources being restored. The remaining resources are used to transmit the remainder of the block of information (if any). In the partial resumption approach, the first and/or second mobile radio communication may experience a decreased level of communications service. One way in which the partial resumption may be implemented is to alternately interrupt and resume one of the first and second mobile radio communications in cyclic fashion until the block of information is transmitted.

In an example application of the invention, the mobile communications system is a Code Division Multiple Access (CDMA) system, where mobile communication channels are associated with spreading codes. As a result, the radio resources include spreading codes. Other examples of radio resources include increased transmit power, radio signal processing resources, and radio bandwidth resources. In this example embodiment, the invention is applied to downlink communications from a radio network to mobile radios. However, the invention may also be applied to uplink communications from the mobile radios to the radio network.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION OF THE INVENTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, the present invention may be implemented in any cellular radio communications system. One specific, non-limiting application of the invention is in a CDMA radio communications system.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
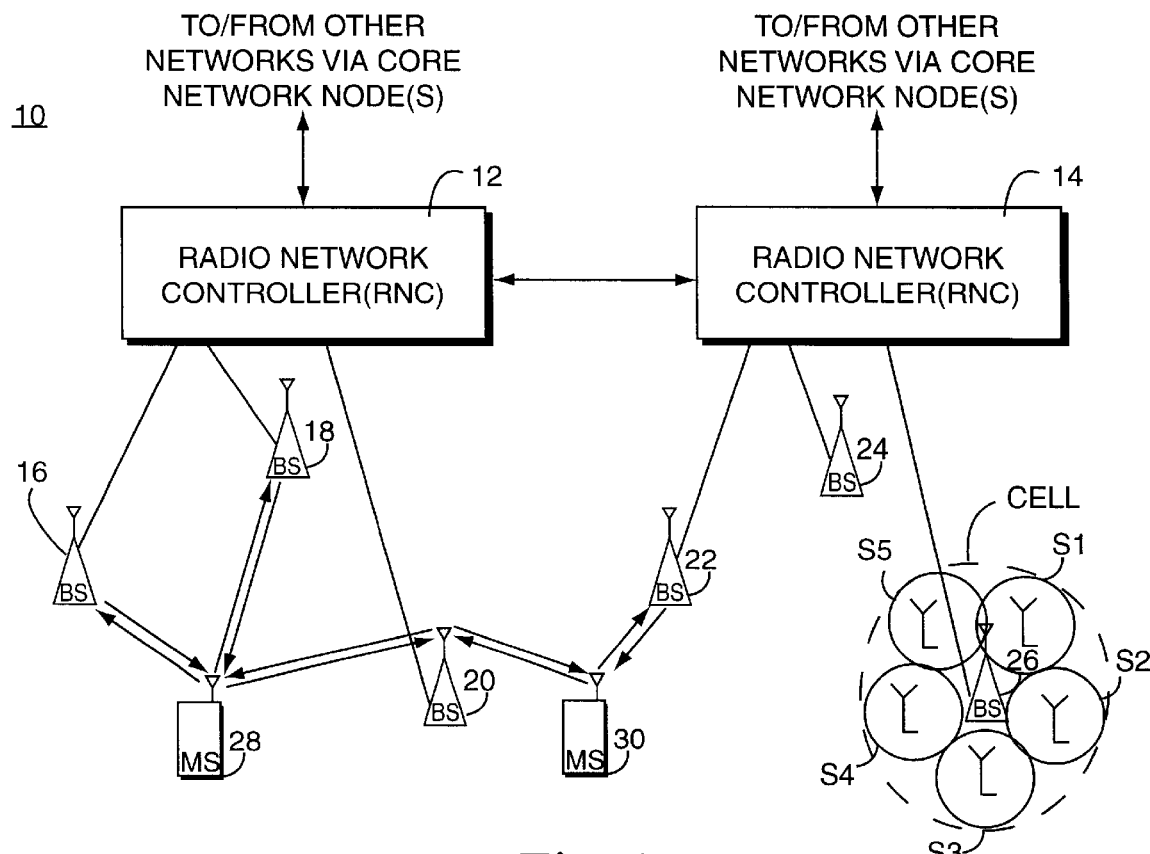
FIG. 1 illustrates a mobile radio communications system in which the present invention may be advantageously employed.

A mobile radio cellular communications system 10 is shown in FIG. 1 and may be, for example, a CDMA or a wideband CDMA communications system. Radio network controllers (RNCs) 12 and 14 control various radio network functions including, for example, radio access bearer setup, diversity handover, etc. More generally, each RNC network controller 12 is coupled to a plurality of base stations 16, 18, and 20. Radio network controller 14 is coupled to base stations 22, 24, and 26. Each base station serves a geographical area referred to as a cell, and a cell may be divided into plural sectors. Base station 26 is shown as having five antenna sectors S1–S5. Each sector also has a corresponding cell area so that in this situation the base station serves five cells. The base stations are coupled to their corresponding radio network controller by a digital line established via dedicated telephone lines, optical fiber links, microwave links, etc. Both radio network controllers 12 and 14 are connected with external networks such as the Public Switched Telephone Network (PSTN), the Internet, etc. through one or more core network nodes like a mobile switching center (not shown) and/or a packet radio service node (not shown).

In FIG. 1, two mobile stations 28 and 30 are shown communicating with 20 plural base stations in diversity handover situations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In a CDMA example embodiment, the term "radio channel" refers to a CDMA channel which is defined in terms of an RF frequency and a particular spreading code sequence.

Figure 2:
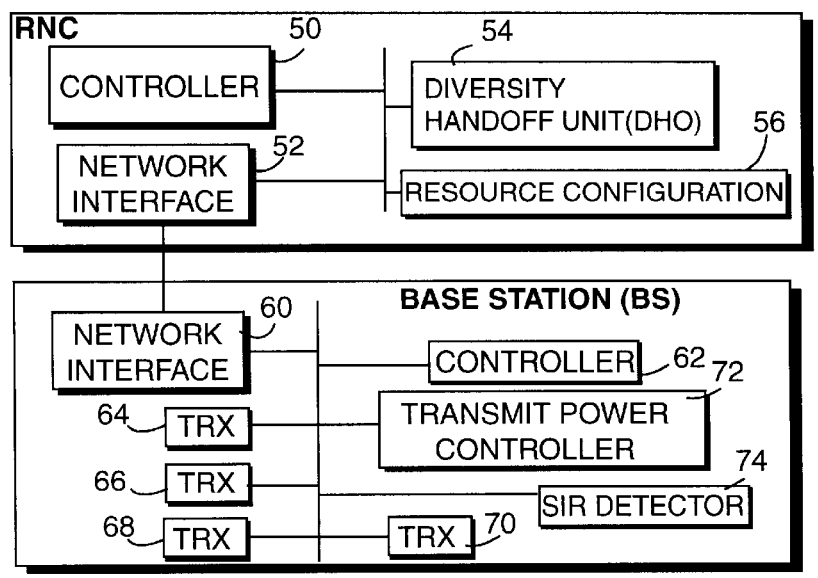
FIG. 2 illustrates simplified function block diagrams of a radio network controller and a base station.

Some additional details of a base station and a radio network controller are now provided in conjunction with FIG. 2. Each radio network controller (RNC) includes a network interface 52 for interfacing communications with various base stations. Within the RNC, the network interface 52 is connected to a controller 50 and to a diversity handover unit DHO) 54. Diversity handover unit 54 performs functions required for establishing, maintaining, and dropping diversity connections such as diversity combining, diversity splitting, power control and other link related radio resource control algorithms. A resource configuration memory 56 stores the status of various allocatable resources that may be used to support communications with mobile radios. The resource status is updated to reflect resource allocations and de-allocations. The controller 50 allocates and deallocates various radio resources including radio channels, transmit power, bandwidth, signal/data processing resources, and/or radio transceiving circuitry in response to user requests. The controller 50 updates the resource configuration memory 56 in accordance with these allocations and deallocations. The RNC may include other control/functional units the details of which are not necessary to the understanding of the invention.

Each base station (BS) includes a corresponding network interface 60 for interfacing with the RNC. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio connections. In the examples described in some detail below, the present invention is implemented in the radio network controller. However, the invention may also be implemented in the base station, especially in smaller or lower budget cellular networks. Representative transceivers 64–70 are individually assigned to specific communications with mobile stations. At least one transceiver is employed as a common control channel over which the base station transmits common signaling such as pilot, synchronization, or other broadcast signaling. Mobile stations within or near that base station's cell(s) monitor the control channel. Transmit power controller 72 performs power control operations based on messages received from the RNC and from mobile stations. One or more signal-to-interference ratio (SIR) detectors 74 (only one is shown for purposes of illustration) may be used to detect the SIR of signals received from mobile stations. Other signal quality detectors may be employed, e.g., CIR ($E_c/I_o$), RSSI, power sensor, etc.

Figure 3:
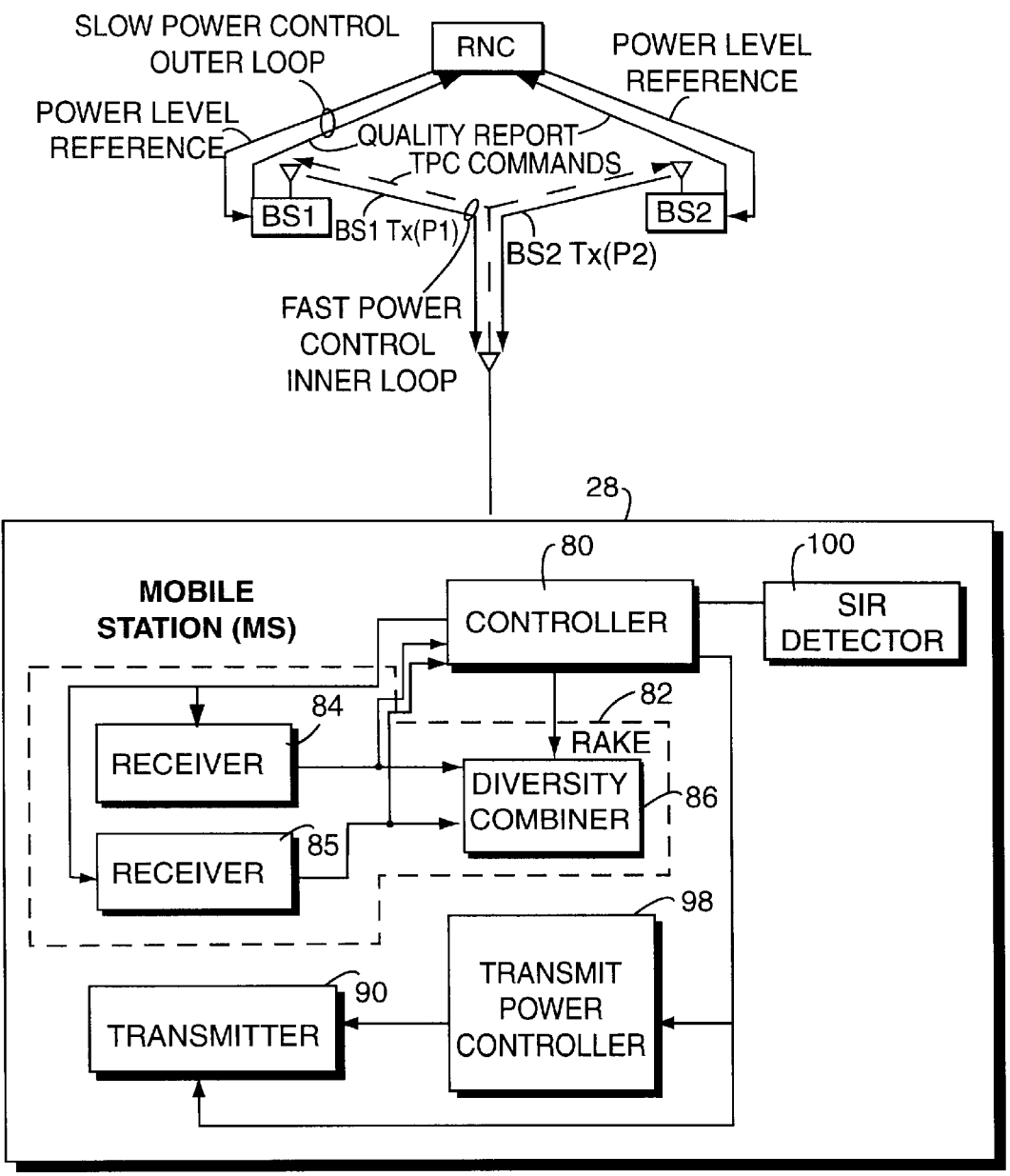
FIG. 3 illustrates a function block diagram of a mobile station as well as various example control signals between base stations and a radio network controller.

FIG. 3 illustrates additional details of an example mobile station 28 shown in FIG. 2. The mobile station 28 includes a controller 80 connected to a RAKE receiver 82, a transmit power controller 98, a transmitter 90, and an SIR (or other signal quality) detector 100. The RAKE receiver 82 includes plural receivers 84 and 85 (there may be additional receivers as well) connected to a diversity combiner 86. One or more signal strength detectors, e.g., SIR detector 100, or similar detector(s) are employed in the mobile receiver 82 to detect the signal strength to interference ratio or other parameter(s) of received signals. The transmissions from base stations are received as multipaths in the receivers 84 and 85, combined in diversity combiner 86, and processed as one signal. Transmit power controller 98 determines the transmit power level (e.g., as a signal-to-interference ratio (SIR)) of the received, diversity-combined signal.

FIG. 3 also shows a non-limiting transmit power control example with two power control loops: an inner power control loop between the mobile station and two base stations BS1 and BS2 and an outer power control loop between the two base stations and the RNC. Based upon signal quality, e.g., SIR, determined from measurements of a received signal, the mobile station generates a transmit power control command and sends it to the base stations BS1 and BS2. Similarly, the base stations BS1 and BS2 send transmit power control commands to the mobile station based on SIR measurements made of signals received from that mobile station. The TPC commands may include one or more bits which indicate a desired increase in transmit power, a desired decrease in transmit power, or possibly in some cases, no change in transmit power. In order to compensate for rapidly changing transmission conditions, these transmit power control commands may be sent very frequently, e.g., 1,500 times a second. In the outer control loop, the RNC monitors signal quality reports provided from the base stations, including SIR values detected by the base and mobile stations for received signals, as well as the actual transmit power levels of base station transmission(s) to the mobile station, and vice versus, if desired.

As explained in the background section, a user may want to send a data file or other block of data at a time when there are insufficient resources to send that file with the desired speed and quality of service. For example, there may not be sufficient radio channel resources, e.g., spreading codes in a CDMA system, or signal/data processing resources available at the base station to transmit the block of data. Although it is possible to increase transmission power in order to transmit the block of data with the desired speed and quality of service, it is desirable to keep such transmission power increases to a minimum since they interfere with other user communications.

The present invention resolves this dilemma by temporarily borrowing radio resources from active traffic communications in the cell. Such borrowing may be implemented by interrupting an active communication completely or by reducing the quality of service provided on an active channel. It will be appreciated that the term "interrupt" includes both a complete interruption or a reduction of service, i.e., a partial interruption. While such traffic channels may be of any service class, it may be preferable to first or only interrupt channels currently providing a lower class of service before interrupting or rather than disrupting a higher class of service. Another preference may be that speech traffic is interrupted before or rather than data traffic. On the other hand, lower quality of service data traffic may be given the same interruption preference as speech, if desired. One such example is User Datagram Protocol (UDP) traffic.

Preferably, interruptions are brief so that they are not detected or have only a minor impact on the active communication. During the interruption time period, the resources supporting those interrupted channels are used to transmit the block of data. After the block of data is sent, the interrupted service resumes. The cumulative transmission power used to send the block of data during the interruption is on the order of the total transmission power that would have been generated by the interrupted traffic channels.

Thus, in addition to the block of data being transmitted without long delays and with only minimal interruption to existing channel services, the total transmit power is not increased.

Figure 4:
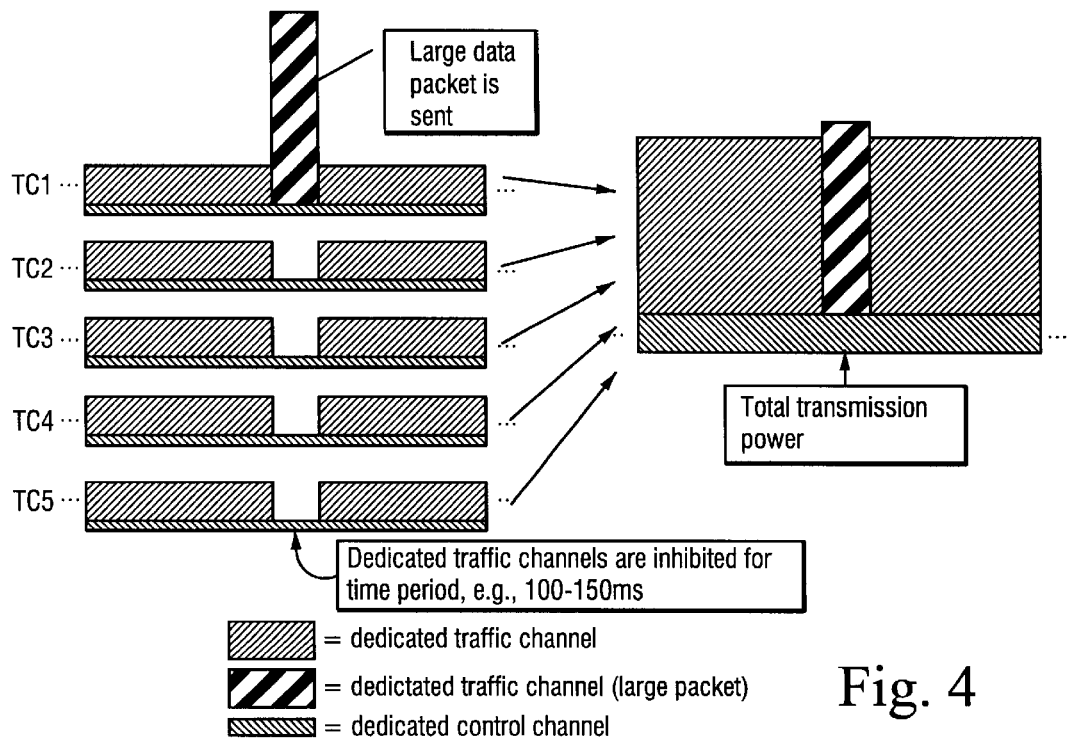
FIG. 4 illustrates in pictorial form one example implementation of the present invention.

FIG. 4 illustrates one non-limiting, example implementation of the present invention in which there are five active channels (TC1–TC5). Each active channel includes a dedicated traffic channel as well as a dedicated control channel. However, the traffic channels could be shared rather than dedicated. In this illustration, the five traffic channels are interrupted for a brief time period, e.g., 100–150 milliseconds. The dedicated control channels are preferably not interrupted. During that interruption time period, a large data packet is sent.

As shown at the right hand side of FIG. 4, the total transmission power for transmitting the large data packet during the interruption time period is only slightly greater than the total transmission power for the five traffic channels. Transmit power is indicated along the vertical axis, and time is indicated along the horizontal axis. While all of the traffic channels are shown as being interrupted in FIG. 4, less than five channels may be interrupted if the data packet to be sent does not require interruption of all five traffic channels. Again, even though complete interruptions are shown in FIG. 4, partial interruptions corresponding to reduced service may be used.

Figure 5:
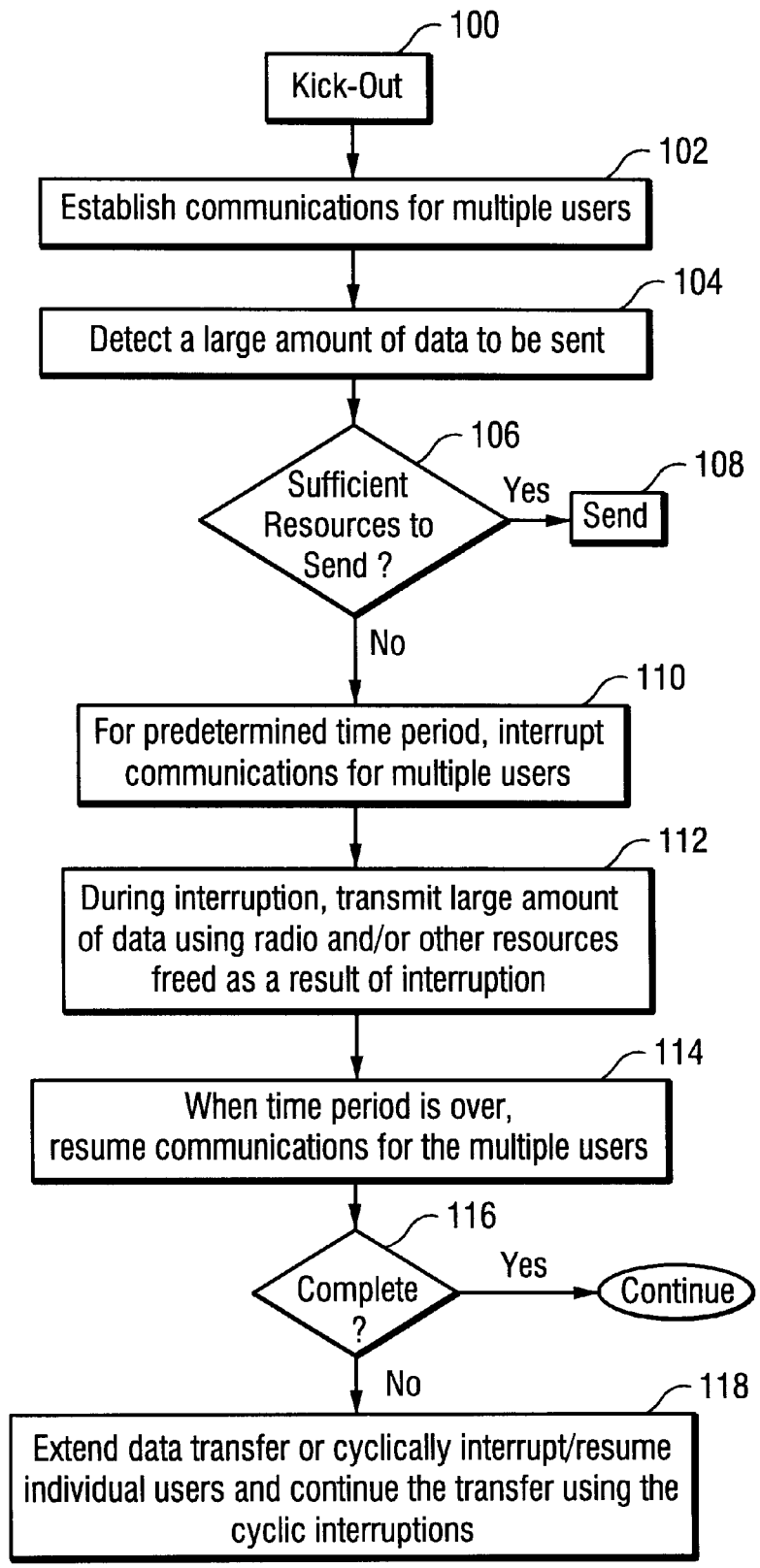
FIG. 5 illustrates in flowchart format a "kick-out" procedure in accordance with an example implementation of the invention.

Reference is now made to the "kick-out" service routine (block 100) in FIG. 5 illustrating one example set of procedures for implementing the present invention (block 100). Communications involving multiple mobile users are established (block 102). Thereafter, a relatively large block of data to be sent is detected (block 104). Such an amount of data may be a large data packet, a data file, etc. A determination is made whether there are sufficient resources in the radio network to send the block of data (block 106). If so, the data is sent using those available resources (block 108). If not, the communications for one or more users (typically multiple users) is interrupted (fully or partially) for a predetermined time period (block 110). The predetermined time period is selected so that the service interruption is hopefully not detectable by the users. If detectable, it is preferred that the interruption not be so big as to be a source of irritation to the users. During the time period, the large amount of data can be transmitted using the radio and/or other resources freed because the interrupted services are temporarily not supported (block 112).

When the predetermined time period is over, communications are resumed (either partially or fully as explained below) for the multiple users for which service was interrupted (block 114). A decision is made in block 116 whether the large block of data was completely transferred. If not, further measures may be taken to complete the transfer. One measure is to simply transmit the remainder of the data using a single traffic channel, if one is available. Moreover, this may take too long to transfer the remaining data. Another approach is to extend the data transfer time period during which the multiple user communications are interrupted (partially or fully) in order to complete the transfer (block 118). This increases the likelihood, however, of irritating the interrupted users. A third alternative is to cyclically interrupt and resume the communications at the individual ones of the users rather than prolong the interruption for all of the users. During these cyclic/alternate interruptions, the transfer of the large data packet is continued until completion. This latter approach is a compromise between having to extend the time period of interruption of all users or simply transmit the remaining data over a single traffic channel. However, it is more complicated to control.

Figure 6:
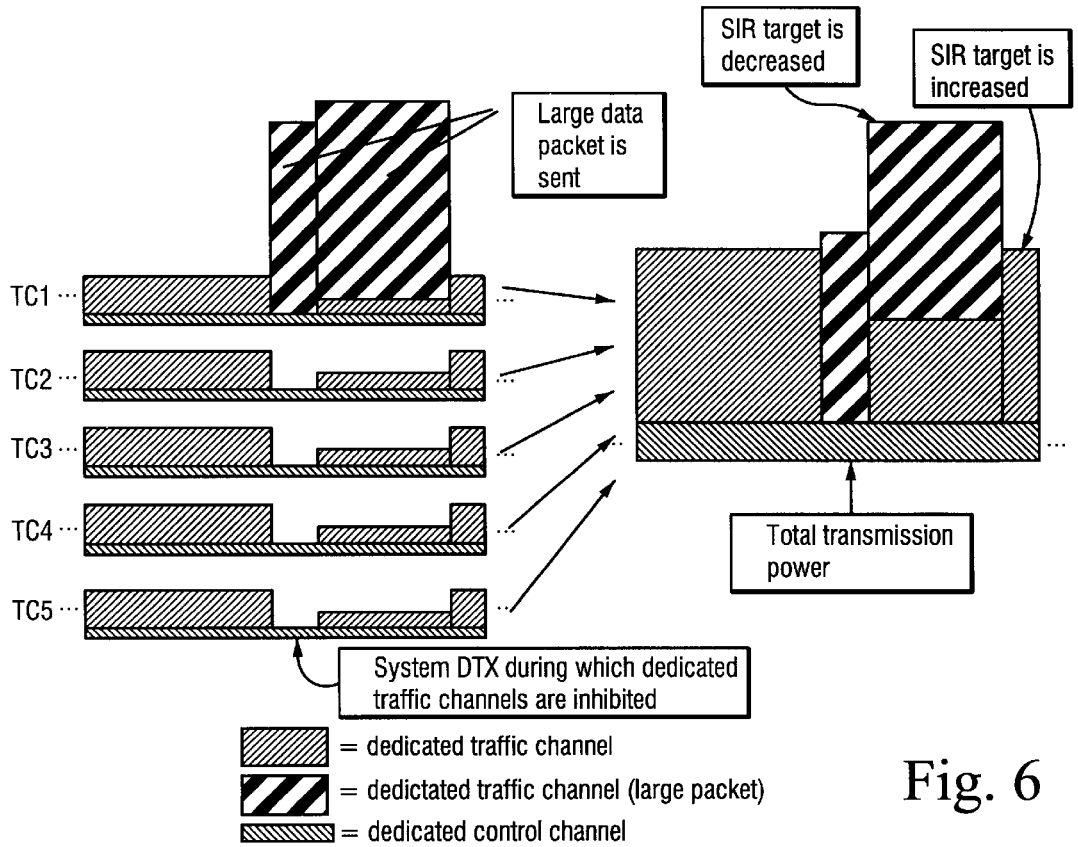
FIG. 6 represents pictorially another example implementation of the present invention.

FIG. 6 illustrates another example embodiment of the present invention in which allocated traffic channel communications are temporarily interrupted using a discontinuous transmission (DTX) functionality normally used for dedicated speech channels during silent periods when there is no speech to be delivered. This DTX functionality maintains the traffic channel. It also lowers transmit power and saves battery life. Such DTX functionality is utilized, in one example embodiment of the present invention, to impose silence on some or all traffic channels for a brief time period in order to "steal" the resources from those silenced users and support the transmission of the block of data. Discontinuous transmission functionality is known, for example, in the GSM cellular communications and is described in the GSM ETSI specification.

As in the scenario illustrated in FIG. 4, there are five active channels TC1–TC5 each having a dedicated control channel and a dedicated traffic channel. Their combined transmit power is illustrated on the right along the vertical axis and time is shown along the horizontal axis. When a large data packet or other block of data is to be sent in a relatively short time period, the DTX functionality is used to interrupt or silence the five traffic channels so that some or all of those traffic channel resources may then be used to send the large data packet. As in FIG. 4, the system DTX silences the traffic channels for a predetermined time period that is relatively short so that it is either not objectionable or not noticed. The DTX functionality is implemented so that it silences the traffic channels with respect to those active users but permits the high speed transfer of a large data packet or other block of data using the freed up resources.

One fairly simple implementation is to completely mute the dedicated traffic channels. At the receiver, the complete mute will be interpreted as a sequence of error frames, however, the control data needed to keep the connection alive is still accurate. If the dedicated traffic channel carries speech data generated by a modern speech coder, the speech decoder will mask the impact of the error frames, and the listener will probably not perceive any noticeable degradation, provided that the DTX period is not too long. This implementation reduces the transmit power, and consequently, the interference on the air interface. However, it will not reduce the use of signal processing resources. To also reduce the use of signal processing resources, additional signaling and resource reallocation efforts may be implemented in the base station If the transfer of the data packet takes more time than the DTX time period, there are a number of options that may be employed, if desired, similar to those described earlier. First, the remaining data may be sent over a shared or dedicated channel if one is available. Second, the DTX silence period may be extended at the risk of users detecting the interruption. A third option is to selectively apply the DTX functionality to individual ones of the traffic channels TC1–TC5 in an alternating fashion so that only one of the traffic channels is silenced at a time. A portion of the remaining data packet is then sent using the resources freed up on each individually-silenced traffic channel until the packet is completely transmitted.

A fourth option, illustrated in FIG. 6, is to lower the transmit power (and therefore the effective service level) for one or more of the traffic channels. Temporarily lowering the signal-to-interference ratio (SIR) target value for those affected traffic channels reduces the transmit power for the user information over those traffic channels. The decrease in service quality may be such that other actions may or may not need to be taken. For example, a decrease in speech quality may require the use of a more robust speech CODEC. As shown in FIG. 6 on the right, this fourth option results in some increased total transmission power, but at a value that is less than the total transmission power if the remaining portion of the large data packet were transmitted at full transmit power resumed in all five traffic channels. After the large packet transfer is complete, the SIR target value for channels with a reduced level of services is restored to previous service levels.

Figure 7:
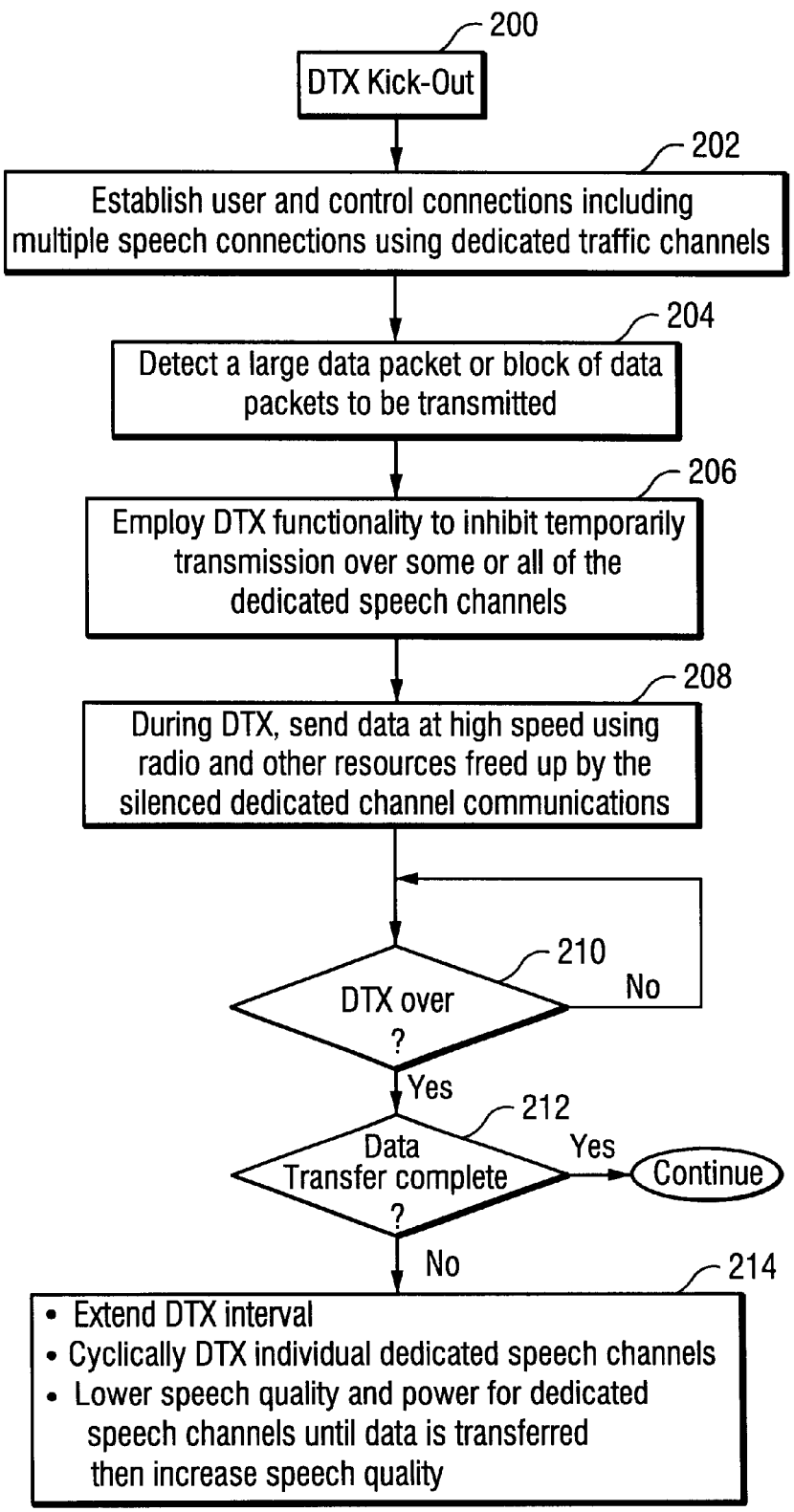
FIG. 7 illustrates in flowchart format a DTX "kick-out" routine in accordance with another example implementation of the present invention.

Reference is now made to the DTX kick-out routine (block 15) described in conjunction with FIG. 7. User and control connections are established including multiple speech connections using dedicated traffic channels (block 202). Any dedicated control channel transmission is not discontinued because it transmits important data needed to keep the connection between the base station and the mobile station "alive." A large data packet, a block of data, or other information is detected to be transmitted in a relatively short time period for which there is no sufficient available resource (block 204). DTX functionality is employed to temporarily inhibit or silence transmission over some or all of the dedicated speech channels (block 206). During the DTX silence period, the data is sent at high speed using radio and perhaps other resources freed up by the silenced dedicated channel communications (block 208). A decision is made in block 210 whether the DTX silence period is over. When it is, a decision is made whether the data transfer is completed (block 212). If the transfer is not completed, several optional actions may be taken to complete the data transfer if desired. The DTX silence interval could be extended as one option. Alternatively, individual dedicated speech channels could be cyclically silenced using the DTX functionality, and during those silent periods, the freed up resources are used to transmit the remaining portions of data. Still further, the speech quality and power of the dedicated speech channels may be lowered, e.g., by lowering the SIR threshold, and the remaining data is transferred using those resources made available by the lowered speech service (block 214).

Accordingly, the present invention permits existing resources from the radio network to be used more efficiently with only a small loss in quality for the "kicked out" or diminished services. This permits rapid transmission of large files even in congested situations, e.g., rush hour conditions, without increased radio interference since the total to transmission power is not substantially increased. Moreover, because interference is not increased, the number of packet retransmissions necessary is reduced. As a result, the total radio network load is lower because fewer packets need to be retransmitted.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. While the information to be transmitted has been described as block of data or as a large data packet, other types of information that need to be transferred in a relatively short time period may also be transmitted using the present invention. The specific example of interrupting traffic channels, and in particular speech channels, is a non-limiting example. There may be situations in which other types of channels could be interrupted. Moreover, while a complete interruption or kick-out of service is shown in the FIG. 4 and FIG. 6 examples for the initial time period, the present invention may also be implemented so that a portion of existing communications are interrupted for a time period. In other words, one or more existing communications receives reduced service for a time period, and the freed up resources resulting therefrom are used to transmit the block of data. Accordingly, it is intended that the invention be limited only by the scope of the claims appended hereto.

What is claimed is:

1. For use in a mobile radio communications system, a method comprising:
   allocating first dedicated radio channel resources to a first mobile radio communication dedicated to the first mobile radio communication for the duration of the first mobile radio communication;
   allocating second dedicated radio channel resources to a second mobile radio communication dedicated to the second mobile radio communication for the duration of the second mobile radio communication, where data is transmitted in parallel at the same time over the first and second dedicated radio channels;
   detecting a need to transmit a block of user information requiring an increased amount of radio resources;
   interrupting or reducing a communications service of the first and second mobile radio communications over the first and second dedicated radio channels for a time period;
   transmitting at least part of the block of information during the time period using at least some of the first and second dedicated radio channel resources allocated for the first and second mobile radio communications for the duration of the first and second mobile radio communications, respectively; and
   thereafter, resuming transmission of the first and second mobile radio communications over the first and second dedicated radio channels, where data is transmitted at the same time over the first and second dedicated radio channels.

2. The method in claim 1, wherein the interruption is effected using a discontinuous transmission operation.

3. The method in claim 1, wherein the block of user information is associated with one of the first and second mobile radio communications.

4. The method in claim 1, wherein the resumed transmission includes resuming transmission of the first and second mobile radio communications using all of the allocated first and second radio resources, respectively.

5. The method in claim 1, wherein the resumed transmission includes resuming transmission of the first and second mobile radio communications using only part of the allocated first and second radio resources, respectively, until the block of information is transmitted.

6. The method in claim 5, wherein the partially resumed transmissions correspond to a reduced level of communications service.

7. The method in claim 1, wherein the first and second mobile radio communications are interrupted cyclically.

8. The method in claim 1, wherein if the block of information is not transferred after expiration of the time period, alternatively interrupting and resuming the first and second mobile radio communications, and wherein a remaining portion of the block of information is transmitted during each of such interruptions using at least some of the radio resources allocated to the interrupted mobile radio communication.

9. The method in claim 1, further comprising:
allocating third radio resources to a third mobile radio communication;
after the detecting step, interrupting or reducing a communications service of the third mobile radio communication for the time period;
transmitting at least part of the block of information during the time period using at least some of the third radio resources; and
thereafter, resuming transmission of the third mobile radio communication.

10. The method in claim 1, further comprising:
after the time period expires, reducing a signal quality condition for the first and second mobile radio communications for a second time period;
continuing transmitting the information using some portion of the radio resources not being used by the first and second mobile radio communications during the second time period; and
thereafter, increasing the signal quality condition for the second radio channel.

11. The method in claim 1, wherein the first and second radio resources include radio speech channels.

12. The method in claim 1, wherein the radio resources include radio signal processing resources.

13. The method in claim 1, wherein the radio resources include radio bandwidth resources.

14. The method in claim 1, wherein the radio resources include increased transmit power.

15. The method in claim 1, wherein the block of information corresponds to a data file.

16. The method in claim 1, wherein the mobile communications system is a code division multiple access system, the mobile communications channels are associated with spreading codes, and the radio resources includes spreading codes.

17. The method in claim 1, wherein the first and second mobile radio communications are downlink communications from a radio network to first and second mobile radios.

18. The method in claim 1, wherein the first and second mobile radio communications are uplink communications from first and second mobile radios to a radio network.

19. For use in a radio communications system where mobile radios communicate with a radio network over a radio interface, apparatus comprising:
a memory configured to store a status of radio resources that may be allocated to mobile radio communications, and
electronic circuitry coupled to the memory and configured to perform the following tasks:
allocate first dedicated radio channel resources to a first mobile radio communication dedicated to the first mobile radio communication for the duration of the first mobile radio communication, and second dedicated radio channel resources to a second mobile radio communication dedicated to the second mobile radio communication for the duration of the second mobile radio communication, where data is transmitted in parallel at the same time over the first and second dedicated radio channels;
update a status of the radio channel resources stored in the memory in accordance with the allocation;
detect a need to transmit a block of user information;
cause the first and second mobile radio communications over the first and second dedicated radio channels to be interrupted or a service level of the first and second mobile radio communications over the first and second dedicated radio channels to be reduced for a time period;
cause at least part of the block of information to be transmitted during the time period using at least some of the first and second dedicated radio channel resources allocated for the first and second mobile radio communications for the duration of the first and second mobile radio communications, respectively; and
cause resumed transmission of the first and second mobile radio communications over the first and second dedicated radio channels, where data is transmitted in parallel at the same time over the first and second dedicated radio channels.

20. The apparatus in claim 19, wherein the electronic circuitry is configured to effect the service interruption or reduction using a discontinuous transmission operation.

21. The apparatus in claim 19, wherein the block of user information is associated with one of the first and second mobile radio communications.

22. The apparatus in claim 19, wherein the electronic circuitry is configured to cause resumption of transmission of the first and second mobile radio communications using all of the allocated first and second radio resources, respectively.

23. The apparatus in claim 19, wherein the electronic circuitry is configured to cause resumption of transmission of the first and second mobile radio communications using only part of the allocated first and second radio resources, respectively, until the block of information is transmitted.

24. The apparatus in claim 19, wherein the electronic circuitry is configured to cause cyclic interruption of the first and second mobile radio communications.

25. The apparatus in claim 19, wherein if the block of information is not transferred after expiration of the time period, the electronic circuitry is configured to cause alternate interruption and resumption of the first and second mobile radio communications, and wherein a remaining portion of the block of information is transmitted during each of such interruptions using at least some of the radio resources allocated to the interrupted mobile radio communication.

26. The apparatus in claim 19, wherein the electronic circuitry is further configured to cause the following:

after the time period expires, a decrease in a signal quality condition for the first and second mobile radio communications for a second time period;

continued transmission of the information using some portion of the radio resources not being used by the first and second mobile radio communications during the second time period; and thereafter, an increase in the signal quality condition for the second radio channel.

27. The apparatus in claim 19, wherein the apparatus is a radio network controller.

28. The apparatus in claim 19, wherein the apparatus is a radio base station.

29. The apparatus in claim 19, wherein the first and second radio resources include radio speech channels.

30. The apparatus in claim 19, wherein the radio resources include radio signal processing resources.

31. The apparatus in claim 19, wherein the radio resources include radio bandwidth resources.

32. The apparatus in claim 19, wherein the radio resources include increased transmit power.

33. The apparatus in claim 19, wherein the block of information corresponds to a data file.

34. The apparatus in claim 19, wherein the mobile communications system is a code division multiple access system, the mobile communications channels are associated with spreading codes, and the radio resources include spreading codes.

* * * * *